United States Patent
Sakaniwa et al.

(10) Patent No.: US 8,330,867 B2
(45) Date of Patent: Dec. 11, 2012

(54) IMAGE PROCESSING APPARATUS AND IMAGE PROCESSING METHOD FOR PRODUCING AN INTERPOLATION FRAME OF AN IMAGE SIGNAL

(75) Inventors: Hidenori Sakaniwa, Yokohama (JP); Mitsuo Nakajima, Yokohama (JP); Masahiro Ogino, Ebina (JP)

(73) Assignee: Hitachi, Ltd., Tokyo (JP)

( * ) Notice: Subject to any disclaimer, the term of this patent is extended or adjusted under 35 U.S.C. 154(b) by 383 days.

(21) Appl. No.: 12/628,308

(22) Filed: Dec. 1, 2009

(65) Prior Publication Data
US 2010/0134682 A1   Jun. 3, 2010

(30) Foreign Application Priority Data
Dec. 1, 2008   (JP) .................................. 2008-305848

(51) Int. Cl.
H04N 9/74 (2006.01)
H04N 11/20 (2006.01)
H04N 5/44 (2011.01)

(52) U.S. Cl. .................... 348/578; 348/441; 348/553

(58) Field of Classification Search .................. 348/602, 348/603, 441, 578, 630, 553; 345/589, 591, 345/593, 600, 606–610, 473–475; 382/162, 382/274; 463/31
See application file for complete search history.

(56) References Cited

U.S. PATENT DOCUMENTS

| 6,976,918 B2 * | 12/2005 | Hosokawa ................... 463/31 |
| 7,142,218 B2 * | 11/2006 | Yoshida et al. ............... 345/589 |
| 2004/0070685 A1 * | 4/2004 | Kondo et al. ................. 348/441 |
| 2007/0273787 A1 | 11/2007 | Ogino et al. |
| 2008/0170161 A1 | 7/2008 | Ogino et al. |

FOREIGN PATENT DOCUMENTS

| JP | 10-108086 A | 4/1998 |
| JP | 10-153946 A | 6/1998 |
| JP | 2000-101942 A | 4/2000 |
| JP | 2004-283241 A | 10/2004 |
| JP | 2008-078704 | 4/2008 |

OTHER PUBLICATIONS

Japan Patent Office office action for application JP2008-305848 (Aug. 21, 2012).

* cited by examiner

*Primary Examiner* — Victor Kostak
(74) *Attorney, Agent, or Firm* — Kilpatrick Townsend & Stockton LLP

(57) ABSTRACT

An image processing apparatus having the cold-warm color producing processing unit for producing the cold-warm color frame, and an interpolation frame producing unit for producing an interpolation frame of the image signal, wherein the interpolation frame producing unit produces the interpolation frame of the image signal, using the cold-warm color frame produced in said cold-warm color producing processing unit.

21 Claims, 8 Drawing Sheets

FIG.8
PURKINJE PHENOMENON

IMAGE PROCESSING APPARATUS AND IMAGE PROCESSING METHOD FOR PRODUCING AN INTERPOLATION FRAME OF AN IMAGE SIGNAL

INCORPORATION BY REFERENCE

The present application claims priority from Japanese application JP 2008-305848 filed on Dec. 1, 2008, the content of which is hereby incorporated by reference into this application.

BACKGROUND OF THE INVENTION

The present invention relates to an image processing apparatus for performing a processing of a picture signal, and an image processing method.

In U.S. Patent Application Publication No. 2008/0170161, there has been described an invention, with a problem of "to provide a technique which is capable of acquiring a picture with less "collapse of pictures", while the effect of improving the moving image quality achieved by frame rate converting operation can be maintained", and as a means for solving the problem, "provided with: a motion vector detecting unit (24) for detecting information as to a motion vector of a picture from a plurality of frames contained in an input picture signal; an interpolation frame producing unit (25) for producing an interpolation frame by employing the motion vector; and a frame stream producing unit (26) for producing and outputting a picture signal of a new frame stream by combining the interpolation frame produced in the interpolation frame producing unit with the frames of the input picture signal", and "When the picture signal processing apparatus performs a converting operation in such a manner that a plurality of interpolation frames are continued between two frames of the input picture signal, at least one interpolation frame among the plurality of interpolation frames is formed as such an interpolation frame formed without employing the motion vector (namely, not depending upon motion of picture)." (refer to abstract of U.S. Patent Application Publication No. 2008/0170161).

In JP-A-2008-78704, there has been described an invention, with a problem of "to provide a television with a function of subliminal effect for giving the most suitable subliminal effect by predicting a target subliminal effect which a user may desire", and as a means for solving the problem, provided with a flash memory 30 for storing a plurality of images giving a subliminal effect, a MPU 31, and an information providing part for providing information being a reference for selection of images stored in the flash memory 30, wherein the information providing part comprises an EPG acquisition part 26 for providing a genre of a program being viewed, a clock 27 for providing information of the present time or day of the week, a climate information providing part 28 for providing information of present climate, and a thermometer 29 for providing information of the present atmospheric temperature; and the MPU 31 acquires some information from the information providing part and reads out a pre-associated image in accordance with contents of the acquired information from a flash memory 30 and inserts the image into a video being viewed, with such a frequency that a viewer is unconscious of the video (refer to abstract of JP-A-2008-78704).

In U.S. Patent Application Publication No. 2007/0273787, there has been described an invention, with a problem of "flexibly converting the number of frames of a displayed image on the basis of a motion in the image or information of an image signal such as a program genre", and as a means for solving the problem, "provided with: an input unit (21) to which an image signal having a predetermined frame rate is input, an information acquirer (24) for acquiring information concerning the input image signal, and a frame rate converter (26) for converting the frame rate of the input image signal and outputting a resultant signal;" "The frame rate converter (26) conducts the frame rate conversion of the input image signal on the basis of the information (such as the motion in the image or the program genre) of the input image signal acquired by the information acquirer (24)" (refer to abstract of U.S. Patent Application Publication No. 2007/0273787).

SUMMARY OF THE INVENTION

As for visual characteristics, it has been known generally that resolution of human eyes goes down for a moving object in high speed on a display, such as panning of a picture, a sport picture, or a telop. Accordingly, such a product has been developed that covers smooth view feeling or resolving feeling by interpolating a picture of 60 frames per second and converting a frame rate to a picture of 120 frames per second or 240 frames per second.

In U.S. Patent Application Publication No. 2008/0170161, as technique for converting this frame rate, frame number is increased by searching a motion vector among a plurality of frames of an input picture signal, producing a new interpolation frame image, on the basis of the preceding and the subsequent frames images, in response to the motion vector searched, and inserting it between the frames.

This technique for converting a frame rate is effective to an object moving in high speed on a display, because frame rate is increased which is capable of compensating for smooth view feeling or resolving feeling, however, in the case of displaying a picture with less motion such as a still image, effect thereof decreases. In addition, it raises problems of increase in power consumption and increase in temperature of a display device, because the number of frames to be displayed is increased and frame display in high-speed rate is performed.

As for this problem of increase in power consumption, in the case where a picture display with less motion, such as a still image, is detected, increase in power consumption can be suppressed by decreasing a display frame rate, as in U.S. Patent Application Publication No. 2007/0273787. However, there is no description concerning ingenuity for increase in temperature of a display device.

On the other hand, in a high-speed frame rate drawing of 120 frames per second or 240 frames per second, frame rate is sped up by predicting a picture between frames to produce an interpolation frame and thus increasing frame number, for a picture of 24 frames per second or 60 frames per second, which is recorded in TV broadcasting or a recording medium or a hard disk.

By high-speed frame rate drawing, one frame becomes about 8.3 ms in the case of 120-frame drawing per second, and one frame becomes about 4.2 ms in the case of 240-frame drawing per second, which makes clear recognition of one frame image difficult by a human, and thus effect of subliminal perception is obtained by insertion of a desired image to an instantaneous one frame.

Subliminal perception is a phenomenon that influences perception, attitude and action afterwards, although recognition by a human has not been attained, in the case where stimulus of equal to or lower than stimulus threshold is presented, which is a border line of whether the stimulus is felt or not felt.

It is considered that effect of subliminal perception utilizing a display device is large, because stimulus from vision is the strongest for a human. In addition, with increasing higher frame rate, it has become easier to present stimulus of equal to or lower than stimulus threshold.

There is a case for producing a subliminal effect, which gives stimulus to the subconscious by inserting a different image to a moving image in an instant degree which a human cannot recognize, or phenomenon called priming, as one kind of this subliminal perception. In JP-A-2008-78704, there has been disclosed an invention which gives optimal subliminal effect by predicting objective subliminal effect which a user may desire. However, there is no consideration on utilization of this subliminal effect for adjustment of sensible temperature of a user.

To solve the above problem, one embodiment of the present invention inserts a cold-warm color frame to a picture signal, as an interpolation frame of the picture signal.

According to the present invention, a display device which a user can operate conveniently and utilizes energy efficiently, can be provided. Specifically, it is capable of attaining energy saving of an air conditioning apparatus (to utilize energy more efficiently) by adjusting a sensible temperature in viewing a display, and thus suppressing output of the air conditioning apparatus.

Other objects, features and advantages of the invention will become apparent from the following description of the embodiments of the invention taken in conjunction with the accompanying drawings.

DESCRIPTION OF THE EMBODIMENTS

Firstly, explanation will be given on outline of the present embodiment. In the present embodiment, there has been proposed an image processing apparatus which inserts cold-warm color to adjust sensible temperature into one frame of high-speed frame rate, as an ingenuity for not making a user in viewing feel temperature increase of a display device by making higher frame rate, or for utilizing temperature increase effectively.

Cold-warm color is a kind of color which utilizes human psychological effect of feeling warm or feeling cool, in viewing certain color. It is said that sensible temperature of warm colors and cold colors, that is, psychological temperature difference, is as large as about 3° C., and thus effect thereof is large.

By displaying the cold-warm color to a viewer by utilizing subliminal perception, effect to vary sensible temperature can be drawn. For example, in the case where a room is hot in summer, it is induced to set an air conditioning apparatus such as an air conditioner to higher temperature, by inserting a frame of cold colors so as to decrease sensible temperature, and thus not to feel temperature increase caused by the display device.

In addition, for example, in the case where a room is cold in winter, it is induced to set an air conditioning apparatus such as an air conditioner to lower temperature, by inserting a frame of warm colors so as to give increased sensible temperature.

In addition, utilization of subliminal perception (such as subliminal effect) to be worked on the human subconscious is limited only to an image with a specific pattern, to avoid perception other than cold-warm. In this way, effect of specific subliminal perception can be obtained efficiently.

That is, in the present embodiment, in order to suppress power increase or temperature increase of the display device associated with making higher frame rate, switching processing of presence or absence of frame rate conversion is introduced by firstly detecting a motion vector (for example, in the case of a scene with less motion, making higher frame rate is not performed etc.), to attain power saving.

Further, by inserting an interpolation frame of color effective to sensible temperature of a user, on the basis of prediction of room temperature or season, sensible temperature of a user is adjusted and temperature increase of a display device is utilized effectively.

Figure 1:
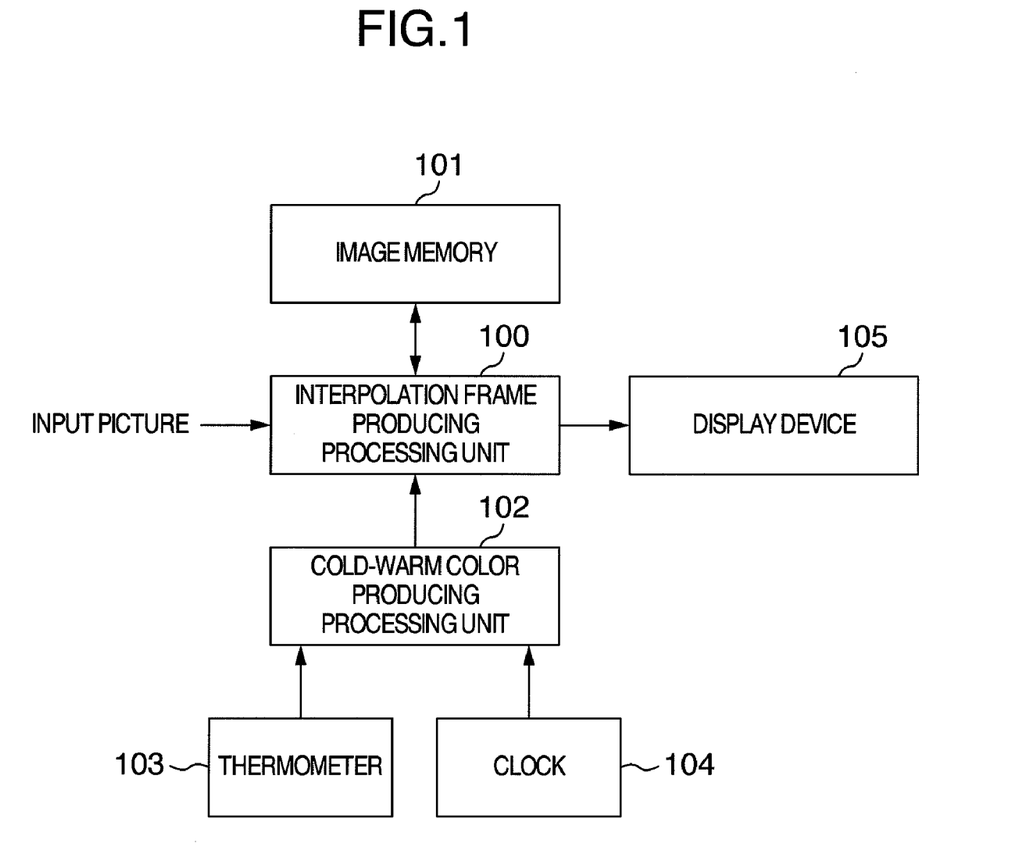
FIG. 1 is a block diagram showing one example of configuration of an image processing apparatus utilizing the cold-warm color of the present embodiment.

Explanation will be given below on more specific embodiments, with reference to FIG. 1 to FIG. 10. FIG. 1 is a block diagram showing one example configuration of an image processing apparatus utilizing the cold-warm color of the present embodiment.

Into an interpolation frame producing processing unit 100, an input picture and cold-warm color information from the cold-warm color producing processing unit 101 are input, and on the basis of these information, an interpolation frame between the frames is produced, and a picture is output to a display device 104 in high-speed frame rate. As the input picture, various ones are considered such as a decoded image of a TV picture received with a tuner, a picture recorded in a medium such as CD or DVD, or a Blue-ray Disc, or a picture stored in a hard disc, or picture contents on a network.

In the interpolation frame producing processing unit 100, output in high-speed frame rate is possible, by which high picture quality can be provided to a user by compensating smooth view feeling or resolving feeling. An image memory 101 memories a signal of an original frame, and the interpolation frame producing processing unit 100 performs production of the above interpolation frame, while making access to this image memory 101.

In addition, the image memory 101 memorizes also this interpolation frame, and by combining the original frame memorized above and the interpolation frame, while making access to this image memory 101, the interpolation frame producing processing unit 100 outputs a picture signal of the above new frame stream.

Into the cold-warm color producing processing unit 102, information concerning surrounding temperature is input from a thermometer (a temperature sensor) 103, and current date and time information from a clock 104. This thermometer or date and time information may not be installed onto the display device itself, as long as the device has a means for acquiring the information by other methods.

For example, in the case where the interpolation frame producing processing of the present invention is incorporated to a device corresponding to a network, temperature information and date and time information may be obtained by utilizing a temperature sensor or a clock connected to the network.

Although an example of a method for producing the cold-warm color will be explained in FIG. 5 to be described later, it has a mechanism for judging the cold-warm color by making reference to surrounding temperature and usual climate database of the district, and speculating at what temperature a user is viewing a picture. A display device 105 is a display device for displaying a picture such as a flat-panel display (a plasma television or a liquid crystal television, an organic EL, an FED (Field Emission Display) or the like) or a CRT.

Utilization of subliminal perception to be worked on the human subconscious may be limited only to an image with a specific cold-warm color pattern, to avoid perception other than cold-warm. There may be provided a firm security mechanism, which inhibits free production of the interpolation frame, except an image with a specific cold-warm color pattern, to obtain only effect of subliminal perception of cold-warm color effectively, or a mechanism for its detection and elimination in the case where the interpolation frame other than other than a specific cold-warm color image pattern is produced intentionally.

As for this security mechanism or elimination mechanism of a subliminal perception image, any means can be OK. In this way, perception other than cold-warm can be avoided. In the present embodiment, an example was shown, where insertion of an interpolation frame other than a specific cold-warm color pattern image is inhibited, however, an interpolation frame other than a cold-warm color pattern image, such as a interpolation frame bringing about beneficial effect for a user, may be produced and used in combination with the interpolation frame of the cold-warm color pattern image.

Figure 2:
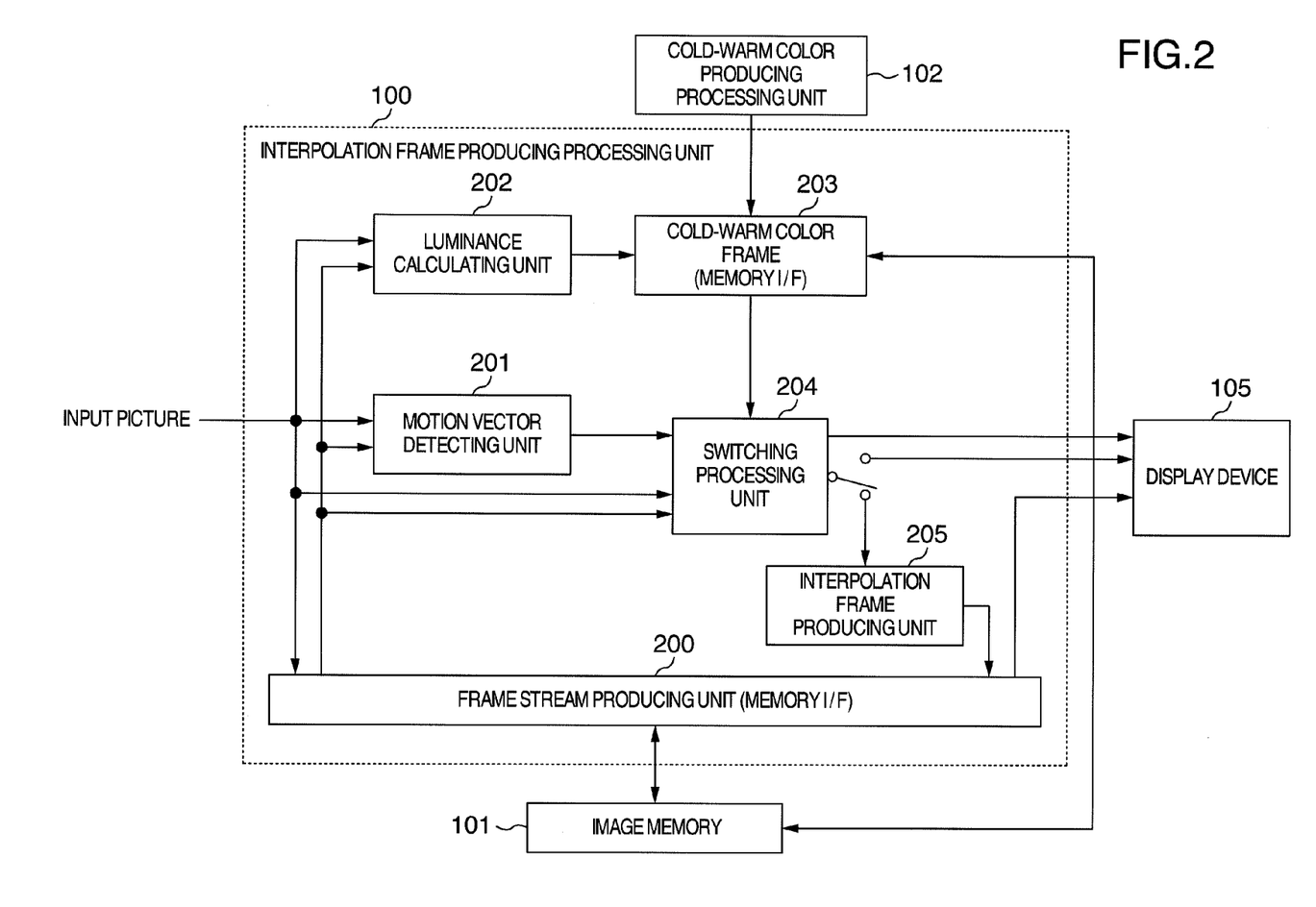
FIG. 2 is a block diagram showing one example of configuration of frame rate conversion of an image processing apparatus of the present embodiment.

FIG. 2 is a block diagram showing one example of configuration of frame rate conversion of the image processing apparatus of the present embodiment.

The interpolation frame producing processing unit 100 writes image information to the image memory 101, via a frame stream producing unit (a memory I/F) 200. A motion vector detecting unit 201 refers to a current frame signal and a preceding frame signal before one frame of the current frame signal, about an input picture input via the interpolation frame producing processing unit 200, and detects a motion vector of an image from these frames.

The frame stream producing unit (a memory I/F) 200 reads out image information from the image memory 101, produces a new frame stream, where the original frame and the interpolation frame are combined, and outputs the picture to a display device 105 in frame rate matching with the frame stream.

The motion vector detecting unit 201 detects an inter-frame motion vector, and detects a motion amount per object unit of an image contained between the frames or in the frame, as a direction vector. As a method for motion vector detection, for example, a block matching method, a gradient method, a phase correlation method or the like may be used.

In a luminance calculating unit 202, average luminance of each of the current frame signal and the preceding frame signal, or partial luminance difference of each frame is calculated.

A cold-warm color frame (a memory I/F) 203 produces the cold-warm color frame by utilizing the cold-warm color produced, in the cold-warm color producing processing unit 102. In the present embodiment, luminance of the cold-warm color frame is determined by utilizing the luminance or the luminance difference from the luminance calculating unit 202. In the case where luminance difference is large in both of the current frame signal and the preceding frame signal, because the cold-warm color frame is floated up or darkened due to difference of luminance thereof, the cold-warm color frame having luminance matching with luminance difference between the frames is produced.

In addition, it is also considered a method for shifting a hue of the cold-warm color frame, by utilizing the luminance information from the luminance calculating unit 202. There is human color perception characteristics called the Purkinje phenomenon, that wavelength of maximal sensitivity differs in scotopic vision and photopic vision, therefore such phenomena generates that sensitivity to red color is high in photopic vision, however, sensitivity to red color decreases and sensitivity to blue color becomes high in scotopic vision.

By utilizing this Purkinje phenomenon, hue of the cold-warm color frame is shifted, on the basis of luminance calculated in the luminance calculating unit 202. For example, in the case where color produced in the cold-warm color producing processing unit 102 is red of warm colors, and on this occasion, in the case luminance calculated in the luminance calculating unit 202 is low and is thus a dark image, because sensitivity of red is low, by performing a processing to still more enhance degree of red color on hue, to increase sensitivity of red, there is effect that desired cold-warm color is obtained irrespective of a scene.

The Purkinje phenomenon is based on scotopic adaptation of eyes, and human eyes adapt to average luminance of the whole screen, and response thereof generates delay, therefore in the case of varying hue utilizing the Purkinje phenomenon in response to luminance, response of average luminance of the whole screen may be delayed by matching with adaptation of eyes. In this way, there is effect that cold-warm color matching with adaptation of eyes can be displayed and subliminal perception can be utilized effectively.

The cold-warm color frame may be an image which is daubed with the cold-warm color produced, or may be an image which is added with meaningless patterns of cold-warm color at a part of the interpolation frame. For example, the vicinity of the circumference of a display may be daubed with cold-warm color, and at the vicinity of the center of the display, a screen displayed in black may be produced, or on the contrary, only the vicinity of the center of the display may be daubed with cold-warm color and the circumference may be the interpolation frame displayed in black. In addition, the cold-warm color frame may be the interpolation frame where color temperature is changed in response to cold-warm color produced, for color information of an input picture signal. For example, in the case where color temperature of the input picture signal is 6500 K, an image where color temperature is decreased to set at 5000 K is used as the interpolation frame, for the case of the warm colors, while an image where color temperature is set at 9300 K is used as the interpolation frame for the case of the cold colors.

The cold-warm color frame is written into the image memory 101 via the cold-warm color frame (a memory I/F) 203, however, the memory I/F may not be prepared newly, and the frame stream producing unit (a memory I/F) 200 may be utilized with sharing.

A switching processing unit 204 selects frame rate of a picture to be output to a display device 105. For example, in the case where an input picture is 60 Hz, the input picture of 60 Hz and an inter-frame motion vector from the motion vector detecting unit 201 are input, and in the case where the inter-frame motion vector is larger than a certain threshold value, in the motion vector detecting unit 201, to enhance smooth view and resolving feeling, one interpolation frame is produced between the current frame and the preceding frame, and a frame stream of 120 frames per second is produced, in an interpolation frame producing unit 205, and it is output to the display device 105 at a timing of 120 Hz in the frame stream producing unit (a memory I/F) 200. On this occasion, at the same time, operating frequency of 120 Hz drive of the display device is set from the switching processing unit 204 to the display device 105.

In the case where the motion vector amount is smaller than a certain threshold value, in the motion vector detecting unit 201, a frame stream of 60 frames per second is output to the display device 105 as it is, without producing an interpolation frame. On this occasion, at the same time, operating frequency of 60 Hz drive of the display device is set from the switching processing unit 204 to the display device 105.

Threshold value for judging inter-frame motion vector amount to determine display frame rate, in the switching processing unit 204, may be present in multiple stages, and in that case, it becomes possible to set the frame rate in multiple stages in response to the motion vector amount. For example, by setting threshold value in 4 stages, which is vector amount threshold values A, B, C and D, switching may be performed in a way A→60 Hz, B→120 Hz, C→180 Hz and D→240 Hz, in response to the motion vector amount of a picture.

In the case where the cold-warm color frame is present in the cold-warm color frame (a memory I/F) 203, a frame stream is produced by using the cold-warm color frame as an interpolation frame in the interpolation frame producing unit 205. However, in the case of a picture with large motion, insertion of the cold-warm color frame as a interpolation frame could impair smooth view feeling, and reduce resolving feeling.

Accordingly, in the case where the inter-frame motion vector is small in the motion vector detection 201, (in the case of motion in a smaller range than a certain threshold value) the cold-warm color frame may be inserted. By setting insertion timing of the cold-warm color frame so as to be inserted in a rate of once per second, for example, in the case where the inter-frame motion vector is less, the interpolation frame is produced in the interpolation frame producing unit 205, and output is performed in 120 Hz onto the display device 105, and in a timing other than this, output is performed in 60 Hz onto the display device 105, without producing the interpolation frame.

Description was give above with an example, where the current frame and the preceding frame are input to the motion vector detecting unit 201, the luminance calculating unit 202 and the switching processing unit 204, however, by inputting still more multiple frames, output onto a display device becomes possible in not only double speed frequency but also various frequencies.

The interpolation frame producing unit 205 predicts an image which may be present between the frames, on the basis of information in the motion vector detecting unit, and produces an interpolation frame, or produces a frame stream using the cold-warm color frame from the cold-warm color frame 203, as an interpolation frame.

The produced frame stream is written into the frame stream producing unit (a memory I/F) 200, controls read-out from the image memory 101 by the frame stream producing unit (a memory I/F) 200, produces a new frame stream, where the original frame and the interpolation frame are combined, and can output the picture onto the display device 105 in frame rate matching with the frame stream.

In accordance with the present configuration, presence or absence of interpolation frame production is switched depending on inter-frame motion vector amount, and in the case of a picture with much motions, priority is given to smoothness and resolving feeling, and a picture is output onto a display device in high-speed frame rate, while in the case of an image with less motion, high-speed frame rate display is not performed, thus it is possible to attain the low power.

Further, low power can be attained by inserting the cold-warm color frame depending on the inter-frame motion vector, setting the output to a display device to high-speed rate only in inserting the cold-warm color frame, and by not performing high-speed frame rate display in timing other than this. In this way, because sensible temperature by inserting the cold-warm color frame can also be adjusted, temperature of an air conditioning apparatus such as an air conditioner can be set to a suppressed state, and thus still more energy saving can be attained.

Figure 3:
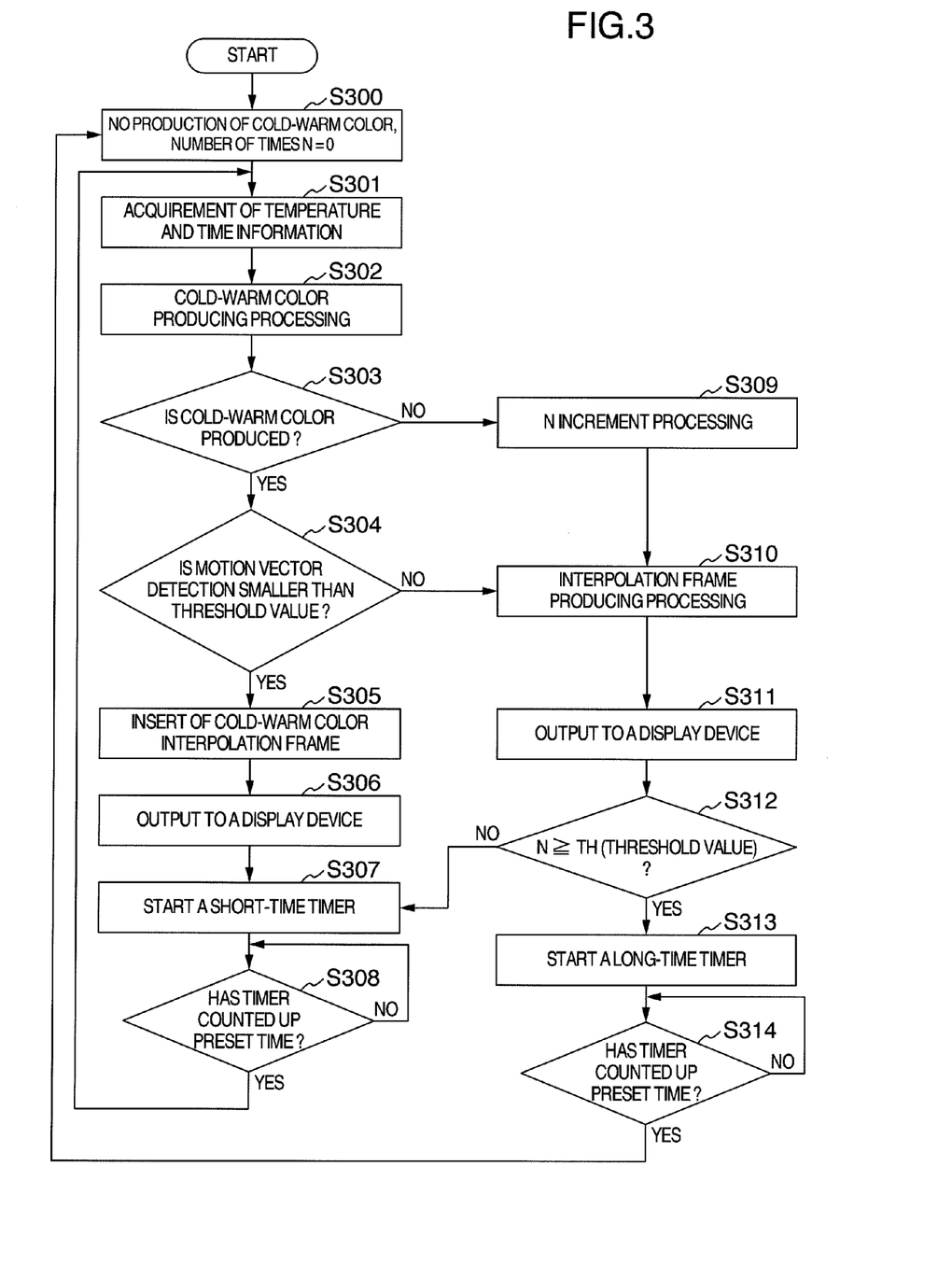
FIG. 3 is one example of an operation flow by difference of presence or absence of the cold-warm color frame of the present embodiment.

FIG. 3 is one example of an operation flow by difference of presence or absence of the cold-warm color frame of the present embodiment.

In the cold-warm color producing processing unit 102, in order to detect the case where a state continues that is judged not necessary to produce the cold-warm color, number of times N is set as no production of cold-warm color, wherein N=0 is set as initial value (S300). In the case where a state of no production of cold-warm color continues, because it is considered that a user is viewing a picture in just good air conditioned environment, effect of power saving can be enhanced in this case, by not performing the acquisition of temperature and time information, and the cold-warm color producing processing for a long period of time.

In the cold-warm color producing processing unit 102, temperature information and time information are acquired from the thermometer 103 and the clock 104 (S301). From temperature and time acquired in the S301, the cold-warm color producing processing is performed in the cold-warm color producing processing unit 102 (S302). In S302, it is judged whether the cold-warm color for adjusting sensible temperature was present or absent in accordance with a rule (S303).

In the case where the cold-warm color was present in S303, it is judged whether the motion vector of the input picture is less or not (S304). In S304, in the case where the motion vector is less, an interpolation frame of cold-warm color is inserted (S305). In the case where the motion vector is much in S304, in order to secure resolution and smoothness view feeling, by producing the interpolation frame in consideration of motion compensation, it is transitioned to the interpolation frame producing processing in consideration of motion compensation of S310.

In S306, a new frame stream is produced, where the original frame and the interpolation frame are combined, and the picture is output onto a display device 105 in frame rate matching with the frame stream.

In S307, temperature information and time information is newly acquired, and a timer, which counts a time to indicate the cold-warm color interpolation frame to a user, is started. Setting value of this timer may be set by a user, in the case of a system having a user interface. In the cold-warm color producing processing unit 102, in the case where the cold-warm color was produced, because it is speculated that environment is not comfortable, a timer of short-time to some extent, is recommended to adjust environment, however, the timer of as short as a several-ms unit increases display frequency of the cold-warm color interpolation frame, and could produce flicker in an image, therefore, it is desirable on a several-seconds basis. Further, by detecting the body temperature or the like of a user, adjustable setting of about several seconds may be allowed in the case where body temperature and atmospheric temperature are apart, or adjustable setting of about several minutes may be allowed in the case of not so large difference between body temperature and atmospheric temperature.

In S308, by waiting the expiration of a short-time timer, and after expiration of the timer, an operation sequence is resumed from S301.

In the case where there is no cold-warm color production in S303, it is considered that a display is viewed in already comfortable air conditioned environment. In S309, in order to measure the number of times N of no production of cold-warm color, increment processing of N is performed. Then, in order to secure resolution as it looks and smooth view feeling, it is transitioned to the interpolation frame producing processing, in consideration of motion compensation (S310).

In S311, a new frame stream is produced, where the original frame and the interpolation frame produced in S310 are combined, and the picture is output onto the display device 105 in frame rate matching with the frame stream.

Then, in S312, in the case where the number of times N of no production of cold-warm color has become equal to or more than a certain threshold value set, because it is considered that comfortable air-conditioned environment has already been continuing, by starting a long period timer (S313) and stopping update processing of temperature or time information, or the cold-warm color producing processing for a long period of time, power consumption is reduced.

In the case where the long period timer has expired, it returns to S300, to clear the number of times of no production of cold-warm color to zero, and again the cold-warm color producing processing is performed, whether adjustment of sensible temperature is necessary or not is judged, and the interpolation frame production is continued.

It should be noted that in the case where the present embodiment was incorporated in a system having a user interface, a mode such as an "eco-mode" is set up, and it may be designed that the present operation sequence is started only when the eco-mode is set up.

Figure 4:
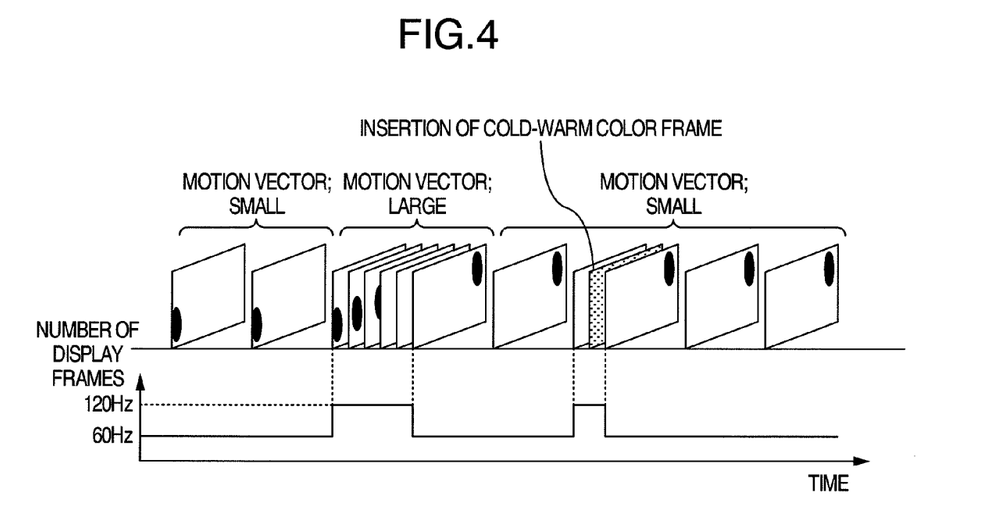
FIG. 4 is a diagram showing one example of relation between a picture and display frame number of the present embodiment.

FIG. 4 is a drawing showing one example of relation between a picture and display frame number of the present embodiment.

FIG. 4 shows an aspect, in which display frame rate is performed with large motion amount and in high-speed of 120 Hz, from a scene where the motion vector amount is judged less in the motion vector detecting unit 201, and display frame rate is judged to be the same 60 Hz as in the input picture in the switching processing unit 204; and further, in the case where the cold-warm color frame is present in a scene where display is performed in 60 Hz due to less motion vector, switching to 120 Hz display is performed in a scene where cold-warm color frame is inserted.

In this way, by displaying a picture in 60 Hz of the input time for a picture with less motion amount, and by displaying in 120 Hz of double speed for a picture with many motion amount, low power can be attained in a picture with less motion amount. Further, by making high-speed frame only in inserting the cold-warm color, subliminal perception in high-speed can be utilized, while suppressing power as much as possible.

It should be noted that in the case of obtaining larger subliminal perception effect, it is also considered a method for substituting one frame of a picture of less motion with the cold-warm color frame. In this case, because of increase in stimulus of subliminal perception, stronger subliminal perception effect can be obtained.

Figure 5:
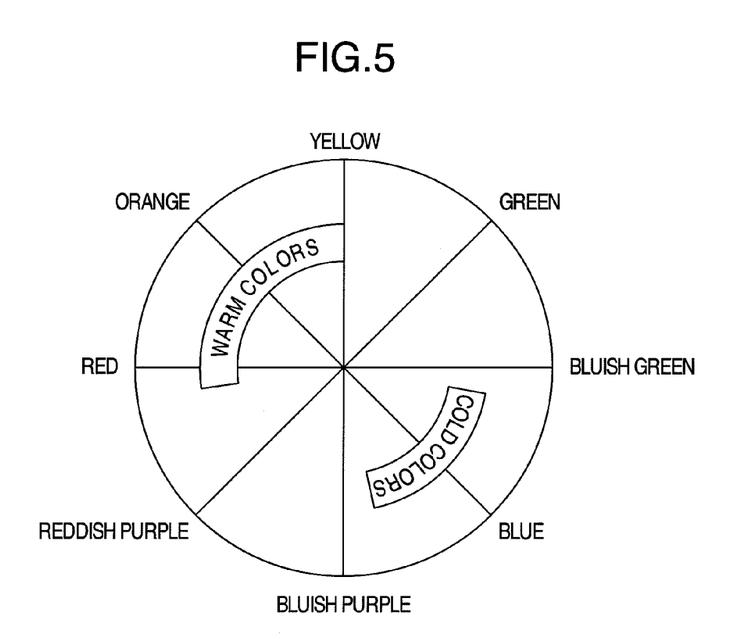
FIG. 5 is a diagram showing one example of cold-warm color to be utilized in the present embodiment.

FIG. 5 is a drawing showing one example of hue of cold-warm color to be utilized in the present embodiment.

Hue from yellow color to red color is warm colors providing warm feeling psychologically and as human perception, and higher temperature is felt with change from yellow color to orange and red. Blue-based hue is cold colors providing cold and cool feeling psychologically and as human perception. Other colors are neutral colors, and because psychological feeling thereof varies personally or depending on situations, they are colors whose feeling cannot be specified.

Figure 6:
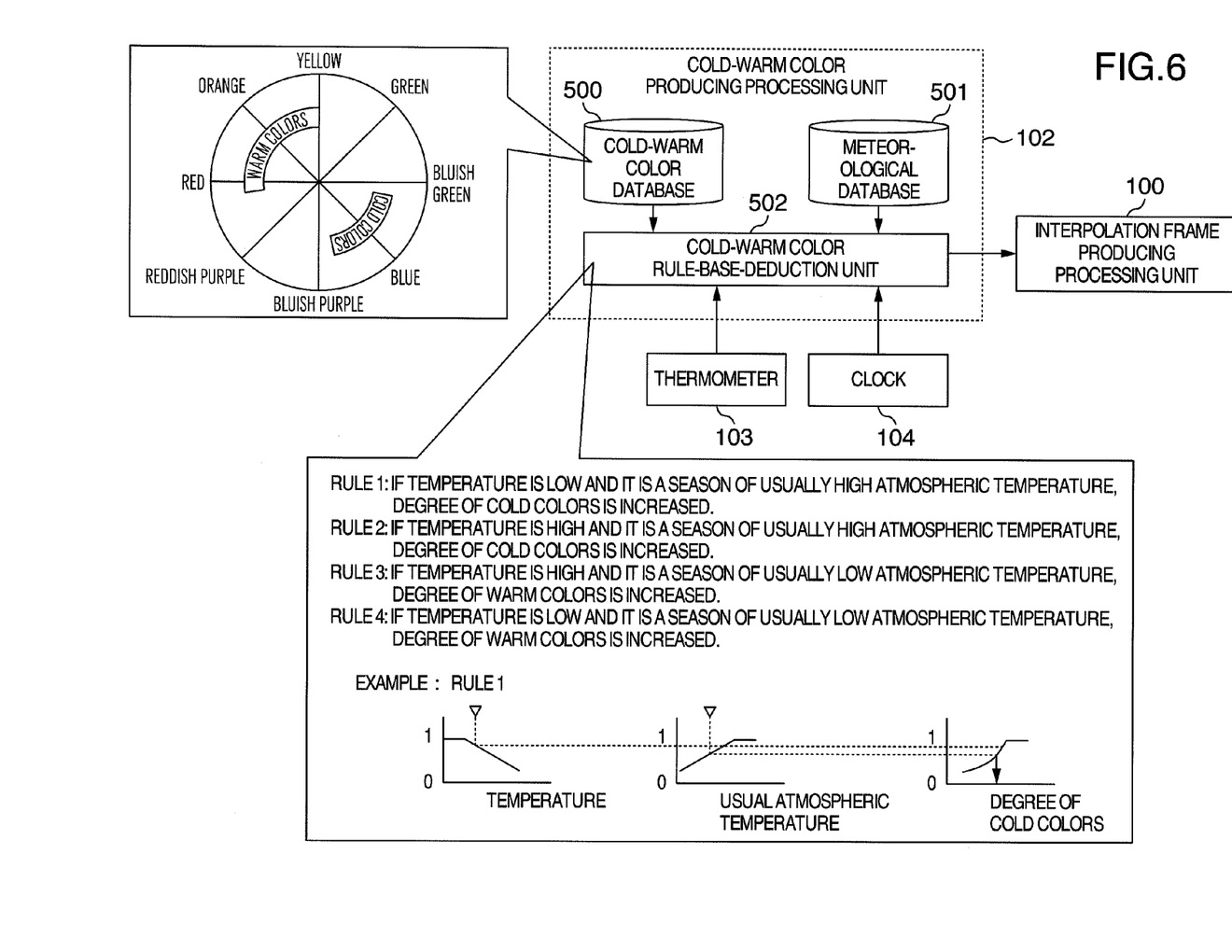
FIG. 6 is a diagram showing one example of configuration of the cold-warm color producing processing unit 102 of the present embodiment, and an example of a method for producing the cold-warm color.

FIG. 6 is a drawing showing one example of configuration of the cold-warm color producing processing unit 102 of the present embodiment, and an example of a method for producing the cold-warm color.

The cold-warm color producing processing unit 102 is provided with a cold-warm color database 500 explained in FIG. 5, and an meteorological database 501, wherein a database is made on atmospheric temperature or the like in each season and each time zone from date and time information, and has a mechanism for calculating a degree of cold colors and warm colors in a cold-warm color rule-base deducting unit 502 utilized the fuzzy deduction or the like, by acquiring the temperature information in a room from the thermometer 103, and the current date and time information from the clock 104.

As the rule-base deduction, for example, in the case where temperature in a room is low in summer (a season of usually high atmospheric temperature), it is considered that a picture is viewed with a display in a well air-conditioned room. In this case, by inserting the interpolation frame of blue color of cold colors, it is considered that sensible temperature can be decreased still more by about 3° C. As a result, it becomes possible to increase temperature setting of an air conditioner by the decreased amount of sensible temperature. This is the following rule 1.

In the following rules, there is shown an example where degree of cold-warm color can be calculated from rule checking degree, by setting a membership function by each rule. In this example, degree of cold colors is calculated from two Minimum ratios, which are ratio of low temperature and ratio satisfying a season of usually high atmospheric temperature.

Similarly, on the basis of experiments or long years of experience, the following rules are prepared, degree of cold colors and warm colors is calculated, and as a result, the cold-warm color produced is notified to the interpolation frame producing processing unit 100.

Rule 1: If temperature is low and it is a season of usually high atmospheric temperature, degree of cold colors is increased.

Rule 2: If temperature is high and it is a season of usually high atmospheric temperature, degree of cold colors is increased.

Rule 3: If temperature is high and it is a season of usually low atmospheric temperature, degree of warm colors is increased.

Rule 4: If temperature is low and it is a season of usually low atmospheric temperature, degree of warm colors is increased.

(Other Rules, if required.)

Figure 7:
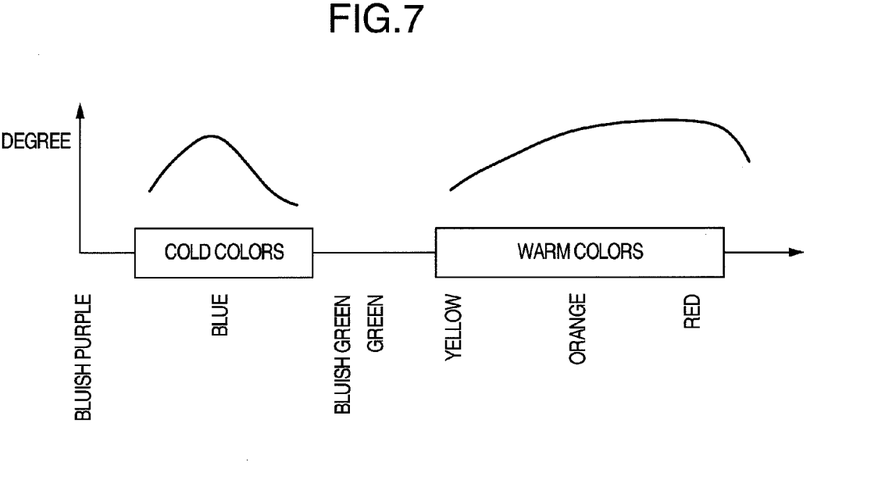
FIG. 7 is a diagram showing an example of degree of cold-warm color to be utilized in producing the cold-warm color, in the cold-warm color producing processing unit 102 of the present embodiment.

FIG. 7 is a drawing showing an example of degree of cold-warm color to be utilized in producing cold-warm color, in the cold-warm color producing processing unit 102 of the present embodiment.

The horizontal axis represents hue, and among cold colors, near blue color region provides the largest degree of cool feeling, and the degree of cool feeling decreases with approaching to bluish purple and bluish green. In warm colors, red color provides the largest degree of warm feeling, and yellow color provides lower degree of warm feeling. From the relation showing this degree, color of the cold-warm color frame to be produced can be determined on the basis of cold-warm degree matching with a surrounding situation.

Figure 8:
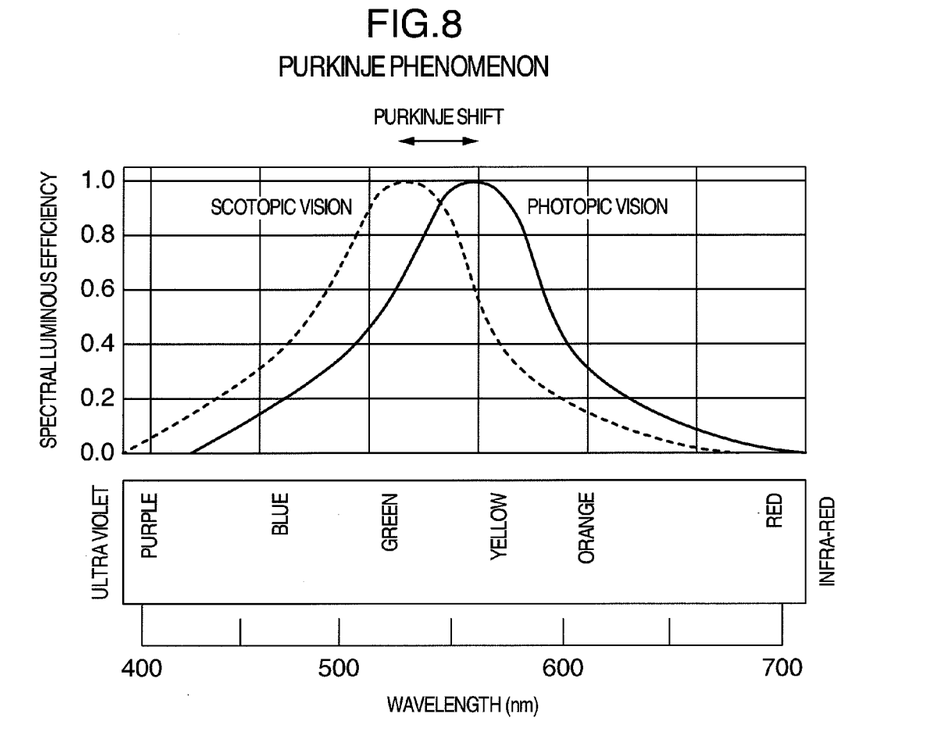
FIG. 8 is a diagram showing a Purkinje phenomenon to be utilized in producing the cold-warm color frame of the present embodiment.

FIG. 8 is a drawing showing the Purkinje phenomenon to be utilized in producing the cold-warm color frame of the present embodiment. Light that human eyes can feel (visible light) has a wavelength of from 380 nm to 780 nm, however, even for light having the same brightness intensity, human eyes recognize light to have different brightness, when wavelength thereof is different, and feeling (sensitivity) thereof becomes different depending on wavelength.

The Purkinje phenomenon is phenomenon providing a different wavelength for maximal sensitivity in scotopic vision and photopic vision, and the maximal sensitivity is about 525 nm in scotopic vision and about 555 nm in photopic vision. That is, such phenomenon produces that in photopic vision, sensitivity to red color is high, however, in scotopic vision, sensitivity of red color decreases, and sensitivity of blue color becomes high.

In the present embodiment, by utilizing the Purkinje phenomenon in production of the cold-warm color frame, an interpolation frame is produced so as to have luminance matching with luminance of an original frame, and color correction is performed by utilizing the Purkinje phenomenon, in response to variation of luminance thereof. For example, in the case of a dark image, because sensitivity of red is low, in order to increase sensitivity of red, by performing processing to still more enhance degree of red color on hue, there is effect to obtain desired cold-warm color irrespective of a scene.

Figure 9:
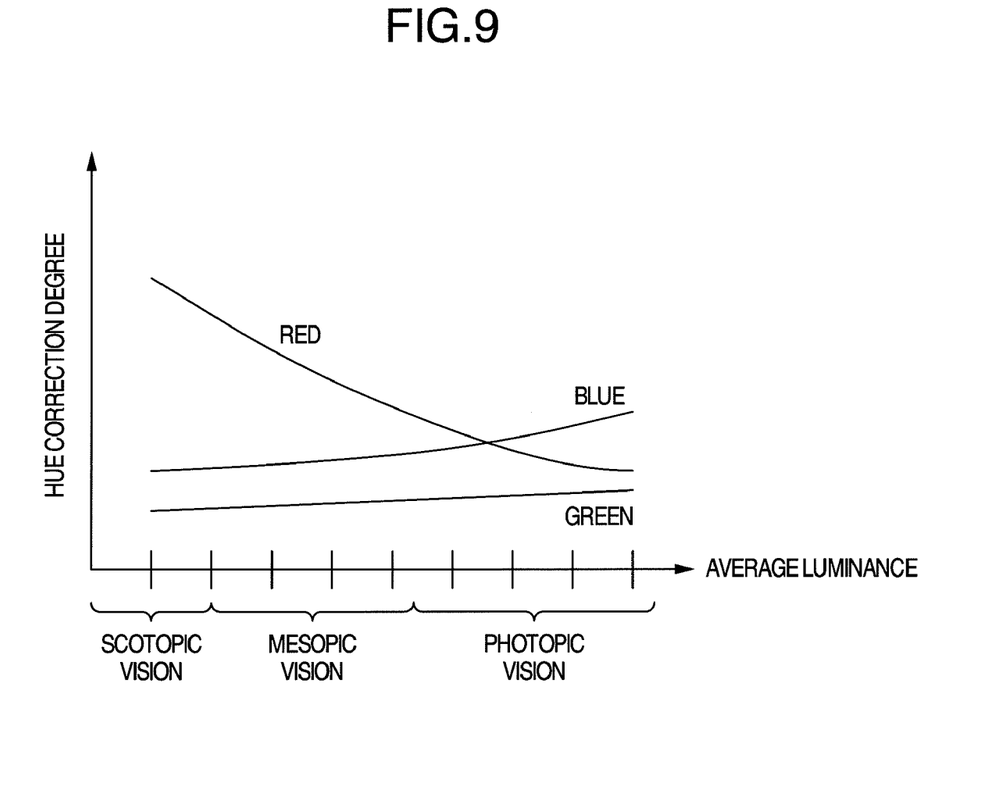
FIG. 9 is a diagram showing one example of color correction value utilizing the Purkinje phenomenon in producing the cold-warm color frame of the present embodiment.

FIG. 9 is a drawing showing one example of color correction value utilizing the Purkinje phenomenon in producing the cold-warm color frame of the present embodiment. One example is shown, in which an intensity of the whole screen on the basis of calculated value of average luminance of a frame is matched, in the luminance calculating unit 202, and color correction in response to the Purkinje phenomenon of FIG. 8 is performed, depending on intensity thereof. It is an example of performing color correction of cold-warm color, by performing the correction of red, blue and green, which are three primary colors of light.

According to the Purkinje phenomenon, because such phenomena generates that sensitivity to red color is high in photopic vision, however, sensitivity of red color decreases and sensitivity of blue color becomes high in scotopic vision, color reproduction as cold-warm color becomes possible by increasing intensity of red color in the dark (low luminance), and by increasing intensity of blue color in the bright.

Figure 10:
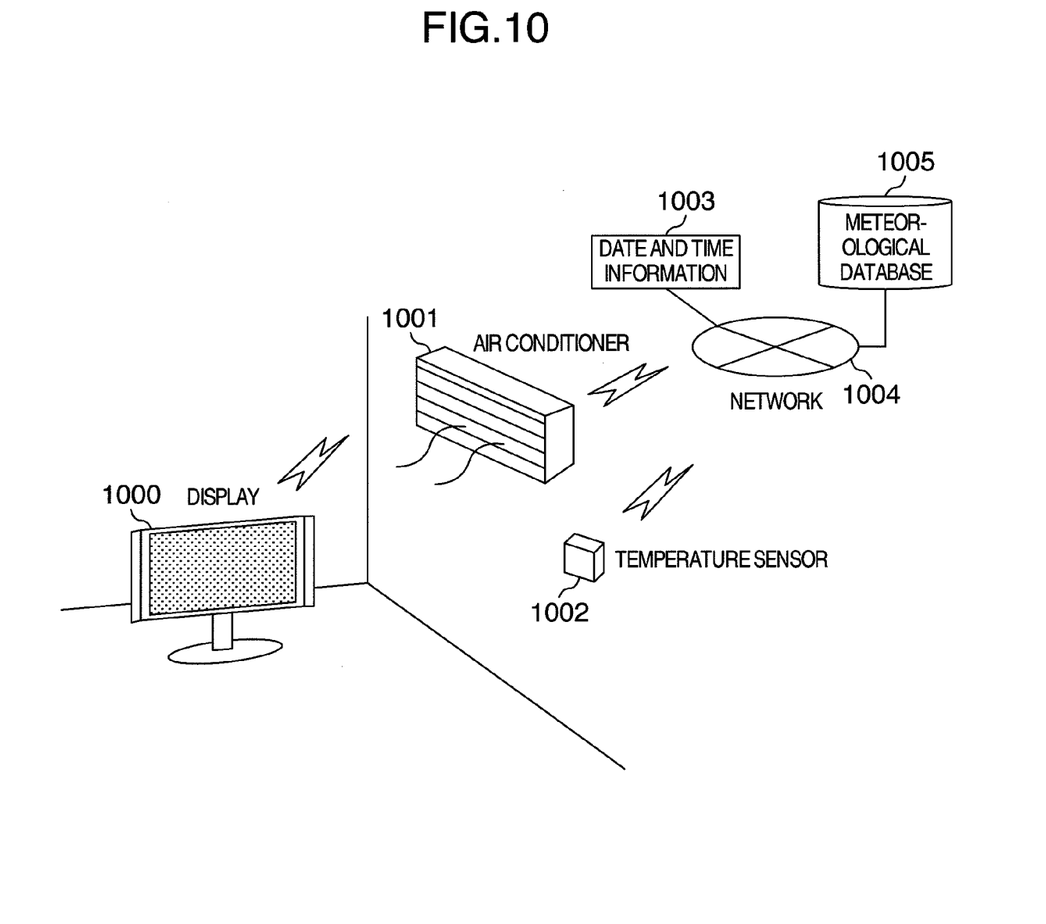
FIG. 10 is a diagram showing a use example of a display incorporated with an image processing apparatus of the present embodiment.

FIG. 10 is a drawing showing a use example of a display incorporated with the image processing apparatus of the present embodiment.

In FIG. 10, a display device 1000 incorporated with the image processing apparatus of the present embodiment is connected to a network via wireless LAN, or wireless communication line, such as W-CDMA, GSM or LTE etc. operated by a communications carrier.

In FIG. 10, an air conditioning apparatus 1001 such as an air conditioner, and a temperature sensor 1002 are similarly connected to a network 1004, via wireless. In the network 1004, a mechanism 1003 which is capable of acquiring the date and time information, and a meteorological database of the relevant region are provided with.

Consideration will be given, for example, on the case where a user is viewing the display 1000 under circumstance of decreased room temperature with the air conditioner 1001, in a hot summer day. This case coincides with a pattern of rule 1 of the cold-warm color rule-base deducting unit 502 of FIG. 6, and thus the cold-warm color frame with large degree of cold colors is produced.

It is considered that, because sensible temperature decreases in this way, a user is guided to set temperature of the air conditioner 1001 higher than that before inserting the cold-warm color frame, resulting in attainment of energy saving of an air conditioner. Because the air conditioners 1001 is connected to a network, after inserting the cold-warm color frame to the display device 1000, it is also possible to automatically set temperature of the air conditioner 1001 relatively higher.

It should be noted that the above-described present embodiments are exemplifications for explanation of the present invention, and the scope of the present invention should not be limited only to the embodiments. For example, in the present embodiment, embodiments are described where the interpolation frame is utilized without varying the original frame, because of priority on picture quality, however, the cold-warm color frame may be inserted to the original frame, within a range not to affect picture viewing. In addition, setting of not utilizing effect of the cold-warm color is also allowed, and in this case, frame rate can be converted in response to variation amount of the motion vector and it can also be utilized as function to attain low power. In addition, in the case where the present embodiment is incorporated in a system having a user interface, it is allowed that, by setting up a mode such as an "ecological mode", the present embodiment is performed only when the "ecological mode" is set up.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. An image processing apparatus for producing an interpolation frame of an image signal, comprising:
    a cold-warm color producing processing unit for producing a cold-warm color frame;
    an interpolation frame producing unit for producing an interpolation frame of said image signal; and
    a temperature sensor for measuring an atmospheric temperature, wherein
    said interpolation frame producing unit produces the interpolation frame of said image signal, using the cold-warm color frame produced in said cold-warm color producing processing unit, and
    said cold-warm color producing processing unit produces the cold-warm color frame, using the atmospheric temperature measured with said temperature sensor.

2. The image processing apparatus according to claim 1, further comprising:

a frame stream producing unit for producing an image signal of a new frame stream, by combining the interpolation frame produced in said interpolation frame producing unit with the frame of said image signal, wherein frame rate of said image signal is converted in accordance with the frame stream produced in said interpolation frame stream producing unit.

3. The image processing apparatus according to claim 1, further comprising:
a clock for acquiring date and time information, wherein the cold-warm color frame is produced, using the atmospheric temperature information of said temperature sensor, and date and time information of said clock, in said cold-warm color producing processing unit.

4. The image processing apparatus according to claim 1, further comprising:
a timer for measuring time, wherein in the case where the cold-warm color frame was not produced in said cold-warm color producing processing unit, said timer is started, and cold-warm color producing processing is not performed newly, till the timer counts up a preset time.

5. An image processing apparatus for producing an interpolation frame of an image signal, comprising:
a cold-warm color producing processing unit for producing a cold-warm color frame;
an interpolation frame producing unit for producing an interpolation frame of said image signal; and
a luminance calculating unit for calculating an average luminance of each frame of said image signal, wherein
said interpolation frame producing unit produces the interpolation frame of said image signal, using the cold-warm color frame produced in said cold-warm color producing processing unit, and
luminance of the cold-warm color frame produced in said cold-warm color producing processing unit is varied in accordance with the average luminance calculated in said luminance calculating unit.

6. The image processing apparatus according to claim 1, further comprising:
a motion vector detecting unit for detecting a motion vector amount of an image from a plurality of frames contained in said image signal, wherein
presence or absence of production of said cold-warm color frame is switched in accordance with the motion vector amount detected in said motion vector detecting unit.

7. The image processing apparatus according to claim 6, wherein
said interpolation frame producing unit does not produce the interpolation frame in accordance with the motion vector amount detected in said motion vector detecting unit.

8. The image processing apparatus according to claim 6, wherein
in the case where the motion vector amount detected in said motion vector detecting unit is smaller than predetermined threshold value, the interpolation frame is not produced in said interpolation frame producing unit.

9. The image processing apparatus according to claim 6, wherein
in the case where the motion vector amount detected in said motion vector detecting unit is larger than predetermined threshold value, the interpolation frame is produced in said interpolation frame producing unit, using a plurality of frames contained in said image signal and said motion vector amount detected in said motion vector detecting unit.

10. The image processing apparatus according to claim 6, wherein
said interpolation frame producing unit produces the interpolation frame by utilizing a plurality of frames contained in said image signal and the motion vector amount detected in said motion vector detecting unit.

11. The image processing apparatus according to claim 6, wherein
said interpolation frame producing unit produces said interpolation frame using the cold-warm color frame produced in said cold-warm color producing processing unit.

12. The image processing apparatus according to claim 5, wherein
in the case of varying the luminance of the cold-warm color frame produced in said cold-warm color producing processing unit, color correction is performed in accordance with the Purkinje phenomenon.

13. An image processing method for producing an interpolation frame of an image signal,
measuring an atmospheric temperature;
producing a cold-warm color frame based on the atmospheric temperature; and
producing an interpolation frame of said image signal, using said cold-warm color frame produced.

14. The image processing method according to claim 13, further comprising:
producing an image signal of a new frame stream by combining said interpolation frame produced and a frame of said image signal; and
converting a frame rate of said image signal in accordance with said frame stream.

15. The image processing method according to claim 13, further comprising:
detecting a motion vector amount of an image from a plurality of frames contained in said image signal, and
switching presence or absence of production of said cold-warm color frame in accordance with said motion vector amount detected.

16. The image processing method according to claim 15, further comprising:
not producing an interpolation frame in accordance with the motion vector amount detected.

17. The image processing method according to claim 15, further comprising:
in the case where said motion vector amount detected is smaller than predetermined threshold value, not producing the interpolation frame.

18. The image processing method according to claim 15, further comprising:
in the case where said motion vector amount detected is larger than predetermined threshold value, producing the interpolation frame by using a plurality of frames contained in said image signal and said detected motion vector information.

19. The image processing method according to claim 15, further comprising:
producing the interpolation frame by utilizing a plurality of frames contained in said image signal and the motion vector amount detected.

20. The image processing method according to claim 15, further comprising:
producing said interpolation frame using the cold-warm color frame.

21. An image processing method of producing an interpolation frame of an image signal, the method comprising:

calculating an average luminance of each frame of said image signal;
producing a cold-warm color frame; and
producing an interpolation frame of said image signal, using the cold-warm frame, wherein
a luminance of said cold-warm color frame produced is varied in accordance with the calculated average luminance.

* * * * *